No. 768,003. PATENTED AUG. 16, 1904.
J. S. STONE.
SPACE TELEGRAPHY.
APPLICATION FILED APR. 11, 1904.
NO MODEL.
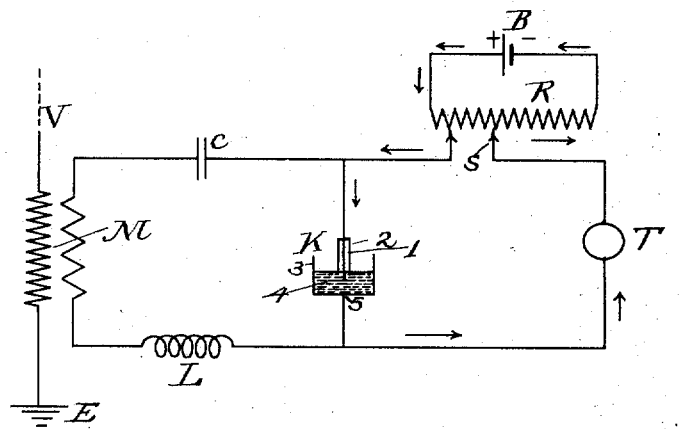
WITNESSES.
INVENTOR.

No. 768,003. Patented August 16, 1904.

UNITED STATES PATENT OFFICE.

JOHN STONE STONE, OF CAMBRIDGE, MASSACHUSETTS, ASSIGNOR TO WILLIAM W. SWAN, TRUSTEE, OF BROOKLINE, MASSACHUSETTS.

SPACE TELEGRAPHY.

SPECIFICATION forming part of Letters Patent No. 768,003, dated August 16, 1904.

Application filed April 11, 1904. Serial No. 202,498. (No model.)

*To all whom it may concern:*

Be it known that I, JOHN STONE STONE, a citizen of the United States, and a resident of Cambridge, in the county of Middlesex and State of Massachusetts, have invented a certain new and useful Improvement in Space Telegraphy, of which the following is a specification.

My invention relates to space telegraphy by electromagnetic waves; and it relates more especially to apparatus for receiving the energy of such waves and translating the same into intelligible signals.

My invention may best be understood by having reference to the drawing accompanying and forming a part of this specification, in which the figure represents in diagram one embodiment of my invention applied to a particular form of space-telegraph system, although it is to be understood that the receiving apparatus may be employed in connection with other forms of receiving systems.

In the figure, V is an elevated receiving-conductor. M is a transformer, preferably a step-down transformer. C is a condenser. L is an inductance. K is a receiver or electroreceptive device. R is a resistance. S is a sliding contact. B is a battery, and T is a signal-indicating device, such as a telephone or siphon recorder. The arrows indicate the direction of current-flow in the local circuit, including the receiver K, the battery B, the resistance R, and the signal-indicating device T.

The receiver or electroreceptive device K comprises, essentially, a vessel 3, containing dilute nitric or sulfuric acid or other suitable electrolyte 4. Into this electrolyte is immersed to a suitable depth—say from .01 to .005—the end of a short length of Wollaston wire or its equivalent, consisting of an inner wire 1, of platinum or other suitable metal, of from .0001 to .00002 of an inch in diameter, surrounded by a jacket 2, of silver or other ductile material, of much larger diameter. Such composite wire and the method of making the same is well known and requires no further description here. Such receivers or electroreceptive devices are well known in this art, having been described, for example, in United States Letters Patent No. 727,331, May 5, 1903. In the operation of this receiver or electroreceptive device the lower end of the Wollaston wire is immersed in the electrolyte to the desired depth, preferably by means of a micrometer-screw. The acid then removes from the inner wire that portion of the silver coating with which it comes in contact. Electrical oscillations developed in the resonant circuit M C K L by electromagnetic signal-waves of the frequency to which said resonant circuit is attuned, impinging upon the elevated conductor, pass through the composite wire, through the fine inner wire 1, which projects into the liquid 4, and through the liquid 4 to the other terminal, 5, of the receiver. The dissipative energy of such electric oscillations elevates the temperature of a very small mass of the electrolyte in the immediate vicinity of the exposed inner wire 1, which projects into the liquid, and inasmuch as the electrolyte has a negative-resistance temperature coefficient such elevation of temperature operates to diminish the resistance of the electrolyte, thereby augmenting the current flowing in the local circuit S T K R and effecting the response of the signal-indicating device T.

I have found that a receiver of the character herein described produces vastly superior results when the positive pole of the battery B or other suitable source of electromotive force is connected to the Wollaston wire which is immersed in the electrolyte 4 and the negative terminal of said battery or other source of electromotive force is connected to the electrolyte itself, as at 5, although the contrary is stated to be the case in the patent above referred to. In fact, I have found the receiver to be practically inoperative unless the battery is so connected. This is due to the fact that in electrolytic decomposition the acid element of the electrolyte goes to the positive electrode, while the basic element goes to the negative electrode. If, therefore, the negative terminal of the battery B be connected to the silver-coated platinum wire 1, the silver will not be dissolved away from the inner platinum wire, while if the positive terminal of said battery B be connected to said silver-coated platinum wire, thus making said wire the positive electrode of the receiver K, the silver coating will be dissolved away from the inner platinum wire, because the silver will be carried in solution over to the negative electrode 5 of the receiver K and deposited on said electrode. If now the battery connection be reversed, the silver previously deposited on the terminal 5 will be dissolved and deposited on the platinum wire 1, which is now the negative electrode of the receiver K, thereby replating the latter with a silver coating substantially as thick as its original coating, and thereby rendering the receiver inoperative or at least greatly impairing its sensitiveness.

The transformer M is preferably a step-down transformer, so that by it the current component of the electrical oscillations developed in the resonant circuit M C K L may be increased.

The resistance R, battery B, and sliding or adjustable contact S constitute a potentiometer, whereby any desired fraction of the electromotive force of the battery B may be impressed upon the receiver K.

I claim—

1. In a receiving apparatus for space-telegraph signals, a vessel containing an electrolyte, a length of composite wire, such as Wollaston wire or its equivalent, one end of which is immersed to a suitable depth in said electrolyte, a source of electromotive force, a potentiometer electrically connected with said source of electromotive force, an electrical connection from said composite wire to the positive pole of said source of electromotive force through said potentiometer, an electrical connection from said electrolyte to the negative pole of said source of electromotive force through said potentiometer, and a signal-indicating device operatively connected with the circuit including said composite wire, said electrolyte and said potentiometer, substantially as described.

2. In a receiving apparatus for space-telegraph signals, a vessel containing an electrolyte, a fine-wire terminal projecting into said electrolyte, a source of electromotive force, a potentiometer electrically connected with said source of electromotive force, an electrical connection from the positive terminal of said potentiometer to said fine-wire terminal, a signal-indicating device, an electrical connection from the negative terminal of said potentiometer to one terminal of said signal-indicating device, and an electrical connection from the other terminal of said signal-indicating device to said electrolyte, substantially as described.

3. In a space-telegraph receiving system, a resonant circuit, attuned to the frequency of the electromagnetic signal-waves the energy of which is to be received, in combination with a receiving apparatus for space-telegraph signals, comprising a fine-wire terminal projecting into an electrolyte, a source of electromotive force, the positive pole of which is electrically connected to said fine-wire terminal and the negative pole of which is electrically connected to said electrolyte, and a signal-indicating device operatively connected with the circuit including said fine-wire terminal, said electrolyte and said source of electromotive force.

4. In a space-telegraph receiving system, a circuit, attuned by capacity and inductance to the frequency of the waves the energy of which is to be received, in combination with a receiving apparatus for space-telegraph signals adapted to utilize in its operation the dissipative energy of the electrical oscillations developed by electromagnetic signal-waves in the receiving system and comprising a fine-wire terminal projecting into an electrolyte, a source of electromotive force, the positive pole of which is electrically connected to said fine-wire terminal and the negative pole of which is electrically connected to said electrolyte, and a signal-indicating device operatively connected with the circuit including said fine-wire terminal, said electrolyte and said source of electromotive force.

5. In a space-telegraph receiving system, an elevated receiving-conductor and a resonant circuit, attuned to the frequency of the waves the energy of which is to be received, inductively associated with said conductor, in combination with a receiving apparatus for space-telegraph signals comprising a fine-wire terminal projecting into an electrolyte, a source of electromotive force and a signal-indicating device.

6. In a space-telegraph receiving system, an elevated receiving-conductor and a resonant circuit, attuned to the frequency of the waves the energy of which is to be received, associated with said conductor, in combination with a receiving apparatus for space-telegraph signals comprising a fine-wire terminal projecting into an electrolyte, a source of electromotive force and a signal-indicating device.

7. In a space-telegraph receiving system, an elevated receiving-conductor and a resonant circuit, attuned to the frequency of the waves the energy of which is to be received, inductively associated with said conductor by means of a step-down transformer, in combination with a receiving apparatus for space-telegraph signals comprising a fine-wire terminal projecting into an electrolyte, a source of electromotive force and a signal-indicating device.

8. In a space-telegraph receiving system, an elevated receiving-conductor and a circuit, attuned by capacity and inductance to the frequency of the waves the energy of which is to be received, associated with said conductor, in combination with a receiving apparatus for space-telegraph signals adapted to utilize in its operation the dissipative energy of the electrical oscillations developed by electromagnetic signal-waves in the circuit in which it is included and comprising a fine-wire terminal projecting into an electrolyte, a source of electromotive force and a signal-indicating device.

In testimony whereof I have hereunto subscribed my name this 9th day of April, 1904.

JOHN STONE STONE.

Witnesses:
BRAINERD T. JUDKINS,
G. ADELAIDE HIGGINS.

---

Corrections in Letters Patent No. 768,003.

It is hereby certified that in Letters Patent No. 768,003, granted August 16, 1904, upon the application of John Stone Stone, of Cambridge, Massachusetts, for an improvement in "Space Telegraphy," errors appear in the printed specification requiring correction, as follows: On page 1, line 38, ".01" should read *.01"*; in line 39, ".005" should read *.005"*; in line 42, ".0001" should read *.0001"*, and ".00002 of an inch" should read *.00002"*; in line 58, a comma should be inserted after the word "oscillations," and in line 61, the comma after the word "attuned" should be stricken out; and that the said Letters Patent should be read with this correction therein that the same may conform to the record of the case in the Patent Office.

Signed and sealed this 4th day of July, A. D., 1905.

[SEAL.]

F. I. ALLEN,
*Commissioner of Patents.* to be received, associated with said conductor, in combination with a receiving apparatus for space-telegraph signals adapted to utilize in its operation the dissipative energy of the electrical oscillations developed by electromagnetic signal-waves in the circuit in which it is included and comprising a fine-wire terminal projecting into an electrolyte, a source of electromotive force and a signal-indicating device.

In testimony whereof I have hereunto subscribed my name this 9th day of April, 1904.

JOHN STONE STONE.

Witnesses:
BRAINERD T. JUDKINS,
G. ADELAIDE HIGGINS.

---

It is hereby certified that in Letters Patent No. 768,003, granted August 16, 1904, upon the application of John Stone Stone, of Cambridge, Massachusetts, for an improvement in "Space Telegraphy," errors appear in the printed specification requiring correction, as follows: On page 1, line 38, ".01" should read $.01''$; in line 39, ".005" should read $.005''$; in line 42, ".0001" should read $.0001''$, and ".00002 of an inch" should read $.00002''$; in line 58, a comma should be inserted after the word "oscillations," and in line 61, the comma after the word "attuned" should be stricken out; and that the said Letters Patent should be read with this correction therein that the same may conform to the record of the case in the Patent Office.

Signed and sealed this 4th day of July, A. D., 1905.

[SEAL.]

F. I. ALLEN,
*Commissioner of Patents.*

It is hereby certified that in Letters Patent No. 768,003, granted August 16, 1904, upon the application of John Stone Stone, of Cambridge, Massachusetts, for an improvement in "Space Telegraphy," errors appear in the printed specification requiring correction, as follows: On page 1, line 38, ".01" should read *.01"*: in line 39, ".005" should read *.005"*; in line 42, ".0001" should read *.0001"*, and ".00002 of an inch" should read *.00002"*; in line 58, a comma should be inserted after the word "oscillations," and in line 61, the comma after the word "attuned" should be stricken out; and that the said Letters Patent should be read with this correction therein that the same may conform to the record of the case in the Patent Office.

Signed and sealed this 4th day of July, A. D., 1905.

[SEAL.]

F. I. ALLEN,
*Commissioner of Patents.*